May 19, 1959 R. J. EHRET ET AL 2,887,642
DAMPED SERVOMOTOR SYSTEM
Filed Sept. 21, 1955
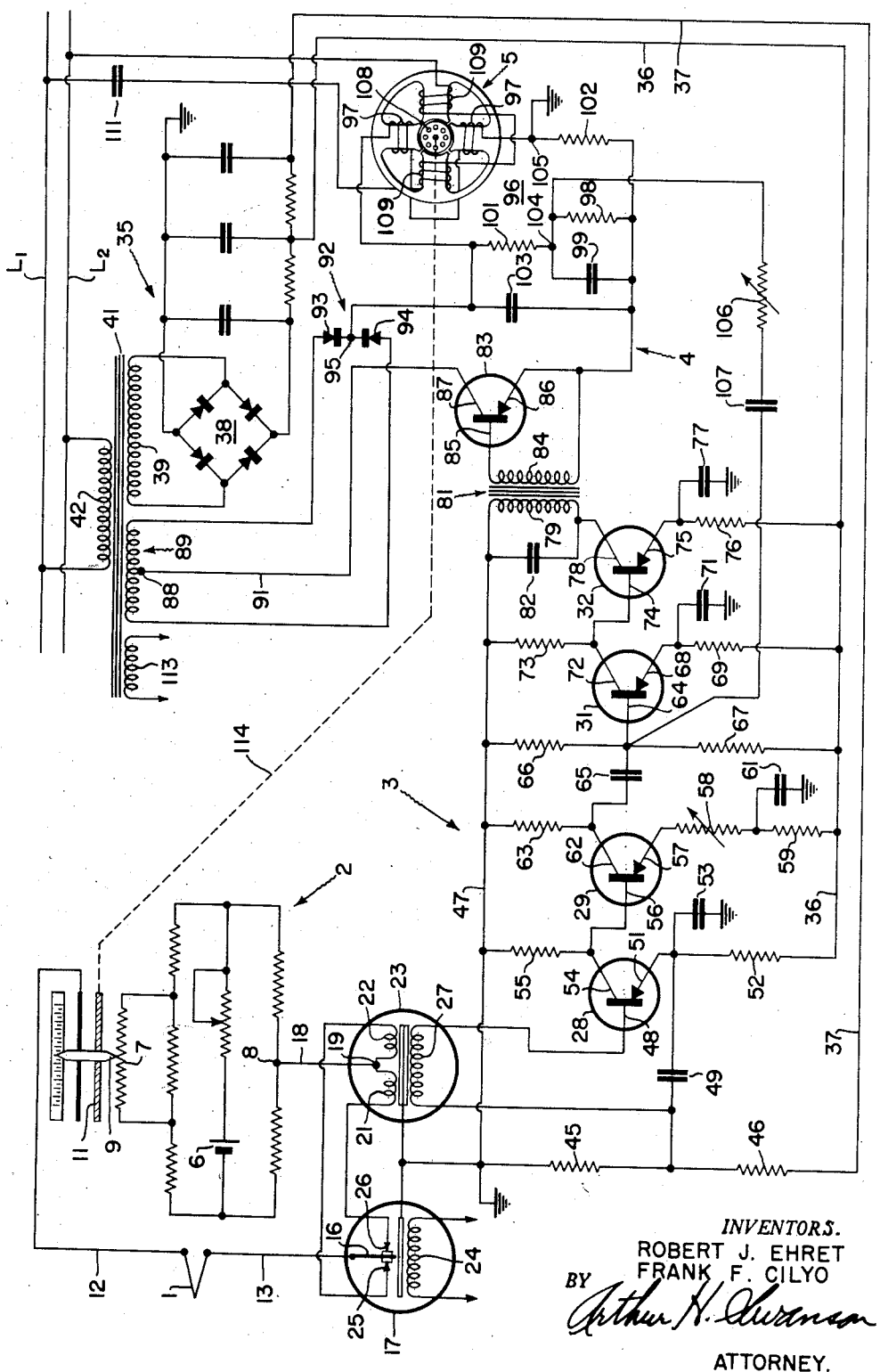
INVENTORS.
ROBERT J. EHRET
FRANK F. CILYO
BY Arthur H. Swanson
ATTORNEY.

United States Patent Office 2,887,642
Patented May 19, 1959

2,887,642

DAMPED SERVOMOTOR SYSTEM

Robert J. Ehret, Palo Alto, Calif., and Frank F. Cilyo, Levittown, Pa., assignors to Minneapolis-Honeywell Regulator Company, Minneapolis, Minn., a corporation of Delaware Application September 21, 1955, Serial No. 535,694

10 Claims. (Cl. 318—448)

A general object of the present invention is to provide a new and improved measuring and/or control apparatus. More specifically, the present invention is concerned with self-balancing potentiometer type measuring and control apparatus incorporating transistors as the amplifying elements in the combination.

With the advent of the transistor as an amplifying element, there has been a need to adapt the transistor for use in many types of electrical apparatus which had previously utilized vacuum tubes as amplifying elements. As the transistor has many characteristics which are not present in vacuum tubes, the construction of an electrical apparatus, such as a self-balancing potentiometric apparatus, around the transistor has involved many new considerations. The principal deficiency of transistors lies in their lack of static stability. That is, their amplifying and impedance characteristics shift with ambient temperatures and with time. In addition, there are dynamic stability problems, particularly in a high speed self-balancing potentiometric configuration, which must be taken into account. The present invention employs new and novel circuitry for achieving both static and dynamic stability in a self-balancing potentiometric apparatus employing transistors as amplifying elements.

Accordingly, a more specific object of the present invention is to provide a new and improved measuring and/or control apparatus of the self-balancing type employing transistors as its amplifying elements where the apparatus is both statically and dynamically stable.

Still another object of the present invention is to provide a new and improved motor drive circuit utilizing a transistor capable of driving a reversible electric motor in a rebalancing system without overshooting the point of system balance and subsequently hunting.

A further object of the present invention is to employ a transistor as a motor driving element in conjunction with a bridge circuit to provide a motor damping signal.

A still further object of the present invention is to provide a reliable and temperature stable measuring system utilizing a transistor amplifier having a minimum size, low power consumption, and long life.

The various features of novelty which characterize this invention are pointed out with particularity in the claims annexed to and forming part of this specification. For a better understanding of this invention, its advantages, and the specific objects attained with its use, reference should be had to the accompanying drawings and descriptive matter in which there is illustrated and described a preferred embodiment of this invention.

Referring now to the single sheet of drawing there is shown an embodiment of the present invention adapted for measuring the output of a thermocouple 1. Changes in the output of the thermocouple 1 unbalanced a potentiometer measuring circuit 2. This unbalance is amplified by means of an electronic amplifier 3 which is operative to impress upon the input of a motor drive circuit 4, a signal, varying in magnitude and phase, in accordance with the magnitude and direction of the unbalance. The motor drive circuit 4, in turn, operates selectively, in accordance with the phase and magnitude of the signal, to energize a rebalancing motor 5, driving it in the direction and to the extent necessary to rebalance the measuring circuit 2.

The measuring circuit 2 comprises two resistive branch circuits connected in parallel across an energizing circuit. The energizing circuit includes a source of unidirectional voltage, shown here as a battery 6. One of the resistive branch circuits includes a slidewire resistor 7 and the other resistive branch circuit includes a circuit point 8 between a pair of resistors connected in series with one another. A sliding contact 9 engages the slidewire 7 and is adjustable along the length of the latter by the rotation of an adjusting element 11.

The thermocouple 1 is connected by means of a conductor 12 to the sliding contact 9 and is connected by means of a conductor 13 to a polarized vibrating reed 16 of a converter 17. The terminal point 8 is connected by means of a conductor 18 to a common terminal 19 of a pair of primary winding sections 21 and 22 of an input transformer 23. The converter 17 includes a winding 24 energized by alternating current to cause the polarized vibrating reed 16 to vibrate with the frequency of the alternating current impressed on the winding 24. As the reed 16 vibrates back and forth, under the influence of the winding 24, it alternately engages a pair of contacts 25 and 26. The contact 25 is connected to an end terminal of the primary winding section 22 of the input transformer 23 and the contact 26 is connected to an end terminal of the primary winding section 21 of the input transformer 23. The input transformer 23 has a secondary winding 27 which is connected to the emitter-base circuit of a transistor in the first stage of the amplifier 3.

The amplifier 3 is a four stage transistor amplifier employing the transistors 28, 29, 31, and 32, connected in the common emitter configuration, as its amplifying elements. The transistors 28, 29, 31, and 32 are pnp junction type transistors having the usual emitter, collector, and base electrodes. It should be understood, however, that with appropriate changes in circuit parameters and polarities these transistors could be of the npn junction type. The amplifier 3 is energized with direct current from a power supply 35 by means of conductors 36, 37, and 47. The power supply 35 includes a full wave bridge rectifier 38 which has its input terminals connected across a secondary winding 39 of a transformer 41. The transformer 41 has a primary winding 42 which is connected across a source of alternating current, the conductors $L_1$ and $L_2$. As shown, suitable ripple filtering circuits are connected across the output terminals of the bridge rectifier 38.

A pair of resistors 45 and 46, connected between the conductor 37 and the conductor 47, form a base stabilizing voltage divider for the base 48 of the transistor 28 which is connected thereto by means of the secondary winding 27 of the input transformer 23. The junction of the resistors 45 and 46, and hence one end terminal of the input transformer 27, is connected to the emitter 51 of the transistor 28 by means of a capacitor 49. The emitter 51 of the transistor 28 is connected to the conductor 36 by means of a resistor 52 which is bypassed to ground by means of a capacitor 53. The collector 54 of the transistor 28 is connected to the conductor 47 by means of a resistor 55. The collector 54 of the transistor 28 is also directly coupled to the base 56 of the transistor 29. The emitter 57 of the transistor 29 is connected to the conductor 36 by means of an adjustable resistor 58 and a resistor 59. The resistor 59 is bypassed to ground by means of a capacitor 61. The collector 62 of the transistor 29 is connected to the conductor 47 by means of a resistor 63. The collector 62 of the transistor 29 is coupled to the base 64 of the transistor 31 by means of a coupling capacitor 65.

The base 64 of the transistor 31 is connected to the junction of the resistors 66 and 67 which form a base stabilizing voltage divider connected between the conductors 47 and 36. The emitter 68 of the transistor 31 is connected by means of a resistor 69 to the conductor 36. The resistor 69 is bypassed to ground by means of a capacitor 71. The collector 72 of the transistor 31 is connected to the conductor 47 by means of a resistor 73. The collector 72 of the transistor 31 is also directly coupled to the base 74 of the transistor 32. The emitter 75 of the transistor 32 is connected to the conductor 36 by means of a resistor 76 which is bypassed to ground by a capacitor 77. The collector 78 of the transistor 32 is connected through a primary winding 79 of an interstage coupling transformer 81 to the conductor 47. As shown, the primary winding 79 of the transformer 81 is bypassed by means of a capacitor 82.

The transformer 81 is employed to couple the output of the amplifier 3 to the input of the motor drive circuit 4. The motor drive circuit 4 employs a pnp junction transistor 83, connected in the common emitter configuration, as its amplifying element. As shown a secondary winding 84 of the transformer 81 is connected between the base 85 and emitter 86 of the transistor 83. The collector 87 of the transistor 83 is connected to a center tap 88 of a secondary winding 89 of the transformer 41 by means of a conductor 91. The center tap 88 of the secondary winding 89 is the negative terminal of a separate power supply 92 for the motor drive circuit 4. In addition to the secondary winding 89, the power supply 92 includes two rectifiers 93 and 94. A junction 95 between the rectifiers 93 and 94 is the positive terminal of the power supply 92. The bridge network 96 is connected between the positive terminal 95 of the power supply 92 and emitter 86 of the transistor 83. The bridge network 96 includes as one of its arms the motor control winding 97 of the two phase reversible induction motor 5. The diametrically opposed arm of the bridge 96 includes a resistance 98 and a capacitor 99, connected in parallel. The remaining two arms of the bridge network comprise a pair of fixed resistances 101 and 102, respectively. A capacitor 103, having a value suitable for tuning the motor control winding 97, is connected across the bridge input terminals. One of the bridge output terminals is the junction 104 of the resistor 101 and the parallel combination of the capacitor 99 and the resistor 98. The other bridge output terminal is the junction 105 of the motor control winding 97 and the resistor 102. This latter terminal is grounded. The output terminal 104 is connected by means of an adjustable resistor 106 and a capacitor 107 to the base 64 of the transistor 31 in the third stage of the amplifier 3.

In addition to the motor control winding 97, the two phase reversible induction motor 5 includes a rotor 108 and a power winding 109. The power winding 109 of the reversible motor 5 is connected in series with a condenser 111 across the alternating current conductors $L_1$ and $L_2$. The condenser 111 is selected with respect to the power winding 109 so as to form therewith a substantially series resonant circuit at the frequency of the alternating current in the conductors $L_1$ and $L_2$. The rotor 108 of the rebalancing motor 5 is operative through the linkage 114 and the adjusting element 11 to position the sliding contact 9 along the length of the slidewire resistor 7 of the measuring circuit 2.

In considering the operation of the self-balancing potentiometer measuring apparatus of Fig. 1, the voltage across the conductors $L_1$ and $L_2$ will be considered as the reference voltage. The direction of rotation of the two phase reversible induction motor 5 depends upon the phase relationship between the current in the motor power winding 109 and the current in the motor control winding 97. If the current in the control winding leads the current in the power winding by approximately 90°, the motor 5 will turn in one direction. If, on the other hand, the current in the control winding lags the current in the power winding by approximately 90°, the motor 5 will turn in the other direction. As mentioned above, the motor power winding 109 is connected in series with the condenser 111 across the alternating current conductors $L_1$ and $L_2$. In operation, the power winding 109 is continuously energized by current from the conductors $L_1$ and $L_2$. As a result of the series resonant circuit formed by the capacitor 111 and the power winding 109, the current in the power winding is substantially in phase with the voltage across the conductors $L_1$ and $L_2$. Due to the action of the condenser 103 connected across the input terminals of the bridge 96, the current flowing in the control winding 97 lags the current in the output of the transistor by 90°.

When the measuring apparatus of Fig. 1 is unbalanced by a change in the output voltage of the thermocouple 1, current is caused to flow in the circuit comprising the thermocouple 1, the conductor 13, the vibrating reed 16, the contacts 25 and 26, the input transformer primary winding sections 21 and 22, the conductor 18, and the bridge circuit connected between the slidewire contact 9 and the circuit point 8. When such unbalance occurs, the rebalancing motor 5 is energized for rotational operation and adjusts the slider contact 9 in the direction and to the extent necessary to restore the equality of the voltage of the thermocouple and the potential drop across the bridge circuit between the point 8 and the slidewire point engaged by the slider 9. While the apparatus is unbalanced, the direction of the flow of current through the thermocouple is in one direction or the other as the thermocouple voltage exceeds or is less than the voltage drop across the bridge circuit.

When current flows through the thermocouple circuit, the operation of the converter 17 causes current pulses to flow alternately through the transformer primary winding sections 21 and 22. When the voltage unbalance is in one direction, the current pulses pass through each of the winding sections 21 and 22 toward the common terminal 19 and the conductor 18. When the unbalance is in the opposite direction, the current flow through the winding sections 21 and 22 is in the direction away from the common terminal 19. The alternating current induced in the transformer secondary winding 27 is in phase or 180° out of phase with the current flowing in the energizing coil 24 of the converter 17, depending upon the construction of the apparatus. The phase of the current induced in the winding 27 is reversed, or shifted 180° by the reversal of the direction of the current flow through the transformer winding sections 21 and 22. Due to the construction of the converter 17 and since the voltage across the winding 24 is derived from the secondary winding 113 of the transformer 41, the reed 16 vibrates at the frequency of and approximately in phase with the voltage across the conductors $L_1$ and $L_2$.

The unbalanced voltage, in phase or 180° out of phase with the reference voltage, induced in the secondary winding 27 of the input transformer 24 is amplified by means of the electronic amplifier 3. The alternating current signal applied by the transformer 24 across the emitter-base circuit of the transistor 28 varies the emitter-base voltage and thus its base current. The small variations in the base current thereby obtained causes relatively large changes in the collector current flowing through the collector circuit resistor 55. This in turn causes a larger variation in the base current of the transistor 29 thereby affecting a still larger increase in that transistor's collector current. This process of current amplification is repeated in succeeding stages with the amplifier output appearing across the secondary winding 84 of the coupling transformer 81.

In considering the operation of the motor drive circuit 4 the effect of the bridge network 96 will be, for the moment, disregarded. The operation of this network will be explained in detail below. When no current flows through the thermocouple circuit, indicating no temperature change, there is no alternating current signal impressed upon the input of the motor drive circuit 4. Because the transistor 83 is not provided with emitter-base bias its operation can be considered to be in the Class B mode. For the purpose of this explanation, it will be assumed that when there is a temperature decrease the base 85 of the transistor 83 will be negative with respect to the emitter 86 during the first half cycle of the voltage under consideration. The negative signal on the base of the transistor 83 will cause the collector current of that transistor to increase and a current will flow from the positive terminal 95 of the power supply 92 through the motor control winding 97 and the emitter-collector circuit of the transistor 83 to the negative terminal 88 of the power supply 92. During the next half cycle of the control signal, the base electrode 85 of the transistor 83 will be positive with respect to the emitter 86. This positive signal on the base of the transistor 83 will cut off the flow of collector current during this half cycle. However, due to the action of the condenser 103, effectively connected in parallel with the motor control winding 93, the current flow through the motor control winding 97 will appear as a 60 cycle alternating current which leads current through the motor power winding 109 by approximately 90°. This causes motor 5 to adjust the slider contact 9 in a direction and to the extent necessary to restore the equality of the voltage of the thermocouple 1 and the potential drop of the bridge circuit between the circuit point 8 and the slidewire point engaged by the slider 9.

When there is a temperature increase, the base electrode 85 of the transistor 83 will be positive with respect to the emitter 86 during the first half cycle of the line voltage under consideration. This will prevent any collector current from flowing during this half cycle. During the next half cycle of the control signal, the base electrode 85 of the transistor 83 will be negative with respect to the emitter 86. The negative signal on the base of the transistor 85 will cause an increase in collector current flow. Thus, current will flow from the positive terminal 95 of the power supply 92 through the motor control winding 97 and the emitter-collector circuit of the transistor 83 to the negative terminal of the power supply 92. Again, due to the action of the condenser 103, the current which flows through the motor control winding 97 appears as a 60 cycle alternating current which lags the current through the motor power winding 109 by approximately 90°. This causes the rebalancing motor 5 to adjust the slider contact 9 in the direction and to the extent necessary to restore the equality of the voltage of the thermocouple 1 and the potential drop across the bridge circuit between the circuit point 8 and the slidewire point engaged by the slider 9.

The bridge network 96 is provided in order that the speed of the reversible motor 5 may be as great as possible during the rebalancing operation of the potentiometer network 2 without overshooting the point of balance and consequently hunting. This result is obtained by deriving from the bridge network 96 a voltage of the same frequency as the voltage across the conductors L₁ and L₂, the magnitude of which is a function of the motor speed and the phase of which is determined by the direction of rotation of the motor, and by introducing this voltage into the amplifier 3 in opposition to the amplified signal of the unbalance voltage derived from the potentiometer network 2. With this arrangement, as the sliding contact 9 approaches the balance position, the unbalanced voltage of the potentiometer network 2 will decrease in value and if the speed of the motor is such that it would ordinarily coast beyond the balanced position due to its inertia and the inertia of the associated rebalancing mechanism, the opposing voltage which is introduced into the amplifier 3 from the bridge network 96 will produce a temporary condition of balance before the true balance position is reached to thereby anticipate the position at which the motor is deenergized for rotation. By a proper choice of the circuit constants, the opposing voltage derived from the bridge network 96 may be made greater than the amplified quantity of the potentiometric unbalance voltage to produce a positive damping action which will quickly check the motor speed before the balance position is reached and it gradually reduces to zero as the potentiometric unbalance is reduced to zero. Such positive damping action results when the feedback voltage is greater than the amplified quantity of the potentiometric unbalance voltage because the motor 5 is energized for rotation in the direction opposite to that in which it is actually rotating. Such energization is the equivalent of a powerful braking force. The amount of voltage fed back from the bridge network 96 to the amplifier 3 can be regulated by adjusting the variable resistor 106.

The output voltage produced in the output terminals 104 and 105 of the bridge network 96 is due to two effects. One of these effects is the generator action of the coasting motor and the other of which is due to the change in the impedance of the motor control winding 97 when the motor is in rotation. Both of these effects are additive, that is, the voltage created at the bridge output terminals 104 and 105 by one of these effects augments the voltage there produced by the other effect.

The bridge network 96 is of a type known in the art as a Maxwell bridge. In a bridge of this type the state of balance is not affected by variations in frequency of the voltage impressed upon its input terminals. Accordingly, the bridge network 96 is characterized in that when the motor rotor 108 is stationary little or no undesired component of voltage which may load or otherwise adversely affect the amplifier 3 are produced at the bridge output terminals.

Several features of the amplifier 3 tend to make it a highly temperature stable amplifier. The use of the voltage dividers connected to the base electrodes of the transistors in the first and third amplifier stages tend to stabilize the operation of those transistors. In addition, the direct coupling of the first and second and third and fourth amplifier stages will cause any change in the zero emitter collector current of the first or third stage to be cancelled out in the collector circuit resistor of that stage by a similar change to zero emitter-collector current of the second and fourth stages respectively.

The foregoing features when combined in a self-balancing potentiometric apparatus of the type disclosed results in an apparatus which is stable in both a dynamic and static sense while retaining a high speed of response to signal variations in the input.

While, in accordance with the provisions of the statutes, there has been illustrated and described the best form of the invention now known, it will be apparent to those skilled in the art that changes may be made in the form of the apparatus disclosed without departing from the spirit of the invention as set forth in the appended claims, and that in some cases certain features of the invention may be used to advantage without a corresponding use of other features.

Having now described this invention, what is claimed as new and for which it is desired to secure by Letters Patent is:

1. In combination, a transistor having an emitter, a collector, and a base, a two phase reversible induction motor having a power winding and a control winding, a source of energizing voltage, means connecting the control winding of said motor, a first resistor, and said energizing source in series with the emitter-collector circuit of said transistor, a second resistor, a third resistor and a capacitor connected in parallel and in series with said second resistor across said motor control winding to form with said first resistor and said control winding a bridge circuit, and an input circuit connected to the base and emitter of said transistor, said input circuit being connected to include a signal adapted to be derived from said bridge circuit.

2. In combination, a circuit means for producing an alternating current signal having a magnitude and phase proportional to the magnitude and direction of a condition being measured, said means including a rebalancing element, an amplifier having an input and an output, circuit means connecting said first mentioned means to the input of said amplifier, a transistor having an emitter, a collector, and a base, a two phase reversible induction motor having a power winding and a control winding, a source of energizing voltage, means connecting the control winding of said motor, a first resistor, and said energizing source in series with the emitter-collector circuit of said transistor, a second resistor, a third resistor and a capacitor connected in parallel and in series with said second resistor and being connected across said motor control winding and said first resistor to form therewith a bridge circuit, and an input circuit connected to the base and emitter of said transistor, the output of said amplifier being connected to the input circuit of said transistor and mechanical means connecting said motor to said rebalancing means.

3. A self-balancing measuring and control apparatus comprising in combination balanceable means for producing an alternating current signal having a magnitude and phase proportional to the magnitude and direction of a change in the condition being measured or controlled, amplifying means for amplifying said signal, a transistor having an emitter, a collector, and a base, a two phase reversible induction motor having a power winding and a control winding, a source of energizing voltage, means connecting the control winding of said motor, a first resistor, and said energizing source in series with the emitter-collector circuit of said transistor, a second resistor, a third resistor and a capacitor connected in parallel and being connected in series with said second resistor across said motor control winding and said first resistor to form therewith a bridge circuit, an input circuit connected to the base and emitter of said transistor, means for coupling the output of said amplifying means to the input circuit of said transistor, means connecting said motor to said balanceable means, and means connecting said bridge circuit to said amplifying means to supply thereto a motor damping signal.

4. A motor drive circuit comprising a transistor having an emitter, a collector, and a base, a source of direct current, said source of direct current and the emitter-collector circuit of said transistor being connected in series across the input terminals of a bridge circuit, said bridge circuit having for one of its arms the control winding of a two phase reversible induction motor, said induction motor having a power winding adapted to be energized from a source of alternating current, and an input transformer adapted to receive from an amplifier a motor drive signal having a magnitude and phase proportional to the magnitude and direction of desired motor rotation, said transformer having its secondary winding connected directly between the emitter and base of said transistor, the output of said bridge circuit being adapted to be connected in a motor drive signal modifying feedback relationship to the motor drive signal amplifier.

5. A motor drive circuit comprising in combination a transistor having a collector, an emitter and a base, a source of direct current, a two phase reversible induction motor having a power winding and a control winding, said power winding being adapted to be connected to a source of alternating current, said control winding being connected in series with the source of direct current in the collector circuit of said transistor, a normally balanced bridge network, said control winding being connected as an arm of said bridge circuit, and an input circuit comprising a transformer having its secondary winding connected across the emitter-base circuit of said transistor.

6. In combination, circuit means for producing an alternating current signal having a magnitude and phase proportional to the magnitude and direction of a condition being measured, said means including a rebalancing element, an amplifier having an input and an output, circuit means connecting said first mentioned means to the input of said amplifier, a transistor having a collector, an emitter and a base, a source of direct current, a two phase reversible induction motor having a power winding being adapted to be connected to a source of alternating current, said control winding being connected in series with the source of direct current in the collector circuit of said transistor, a normally balanced bridge network, said control winding being connected as an arm of said bridge circuit, an input circuit comprising a transformer having its secondary winding connected across the emitter-base circuit of said transistor, the primary winding of said transistor being coupled to the output of said amplifier, said motor being mechanically connected to said rebalancing element, and means connecting the output of said bridge circuit to said amplifier to provide therein a motor damping signal.

7. A motor control circuit comprising in combination a transistor connected in the common emitter configuration, a two phase reversible induction motor having a power winding and a control winding, the control winding being adapted to be connected to a source of reference voltage, a transformer having a primary winding and a secondary winding, said primary winding being connected to receive a current signal of reversible phase with respect to the phase of the first mentioned current, the secondary winding of said transformer being connected across the emitter-base circuit of said transistor, a source of direct current, and a bridge circuit, the control winding of said motor being connected as an arm of said bridge circuit, said bridge circuit being adapted to produce a control signal modifying voltage.

8. A measuring system comprising in combination a rebalanceable electric network, means for producing an alternating current signal in said network in phase or 180° out of phase with a reference voltage, a four stage amplifier for amplifying said signal, each of said amplifier stages employing a transistor connected in the common emitter configuration as its amplifying element, an input transformer coupling said network to the emitter to base circuit of the transistor in the first amplifier stage, a motor control circuit comprising in combination a transistor connected in the common emitter configuration, a two phase reversible induction motor having a power winding and a control winding, the control winding being adapted to be connected to a source of reference voltage, a transformer having a primary winding and a secondary winding, said primary winding being connected to the output of said amplifier, the secondary winding of said transformer being connected across the emitter-base circuit of said transistor, a source of direct current, and a bridge circuit, the control winding of said motor being connected as an arm of said bridge circuit, said bridge circuit being adapted to produce a control signal modifying voltage and means for feeding said voltage into said amplifier.

9. A self-balancing measuring apparatus comprising in combination a condition sensitive element for producing an electromotive force, a potentiometer circuit for producing an adjustable second electromotive force, a four stage transistor amplifier for amplifying the difference between said electromotive forces, each of said amplifier stages employing a transistor connected in the common emitter configuration as its amplifying element, the first two stages and the last two stages of said amplifier being direct coupled, a motor drive circuit coupled to the output of the transistor in the last stage of said amplifier, said motor drive circuit comprising a transistor connected in the common emitter configuration, a two phase reversible induction motor having a control winding and a power winding, the power winding being adapted to be connected to a source of alternating current, the control winding being connected in the collector circuit of the last named transistor, the motor control winding being also connected as an arm of a bridge circuit, the output of said bridge circuit being coupled to the input of the third stage of said amplifier, and means connecting the motor to the potentiometer circuit for adjusting the electromotive force produced thereby.

10. In combination, a transistor having an emitter, a collector, and a base, means for selectively varying the potential of the base of said transistor with respect to the emitter in phase or 180° out of phase with a reference voltage, a reversible electric motor having a power winding and a control winding, the power winding being adapted to be energized with current in phase with the reference voltage, a source of direct current connected to energize said transistor, and a Maxwell bridge circuit, including as one of its arms the motor control winding, connected across the emitter collector circuit of said transistor, the output of said bridge circuit being connected to said means to reduce the magnitude of the changes in potential applied thereby to said transistor base.

References Cited in the file of this patent
UNITED STATES PATENTS

| | | |
|---|---|---|
| 2,429,257 | Bond | Oct. 21, 1947 |
| 2,675,510 | Belcher | Apr. 12, 1954 |
| 2,695,381 | Darling | Nov. 23, 1954 |
| 2,732,520 | Counalt | Jan. 24, 1956 |
| 2,774,021 | Ehret | Dec. 11, 1956 |